(12) United States Patent
Chen

(10) Patent No.: US 6,167,899 B1
(45) Date of Patent: Jan. 2, 2001

(54) WATER TRANSPORTING DEVICE

(76) Inventor: Chung-Min Chen, 58, Ma Yuan West St., Taichung (TW)

( * ) Notice: Under 35 U.S.C. 154(b), the term of this patent shall be extended for 0 days.

(21) Appl. No.: 09/349,803

(22) Filed: Jul. 9, 1999

(51) Int. Cl.⁷ ..................................................... E03B 7/04
(52) U.S. Cl. .......................... 137/208; 137/357; 137/571; 137/575
(58) Field of Search .................. 137/206, 208, 137/357, 571, 575

(56) References Cited

U.S. PATENT DOCUMENTS

| | | | |
|---|---|---|---|
| 256,291 | * | 4/1882 | Coggin .................................. 137/206 |
| 352,833 | * | 11/1886 | Mott ................................. 137/357 X |
| 745,589 | * | 12/1903 | Fraley .............................. 137/206 X |
| 3,448,759 | * | 6/1969 | Peerman ............................... 137/357 |
| 4,111,224 | * | 9/1978 | Sandstrom ....................... 137/208 X |
| 4,612,951 | * | 9/1986 | Desogus ........................... 137/571 X |
| 5,032,290 | * | 7/1991 | Yamagata et al. ............... 137/357 X |
| 5,778,922 | * | 7/1998 | Schoultz ................................ 137/208 |

FOREIGN PATENT DOCUMENTS

122618 * 2/1878 (FR) ..................................... 137/357

* cited by examiner

*Primary Examiner*—John Rivell (57) ABSTRACT

A water transporting device has a sealed water tank, a water channel device, and a pressure reduction tank. The water channel device has a lowest water box, a plurality of water boxes, a highest water box, a plurality of chambers between two of the water boxes, and a plurality of connection pipes. Each connection pipe is connected to two of the water boxes. Each connection pipe has a water outlet hole in one of the water boxes. A water inlet tube is connected to the sealed water tank. A water outlet tube is connected to the sealed water tank and the lowest water box. A connection tube is connected to the pressure reduction tank and the highest water box. A water outlet pipe is connected to the pressure reduction tank.

1 Claim, 12 Drawing Sheets

WATER TRANSPORTING DEVICE

BACKGROUND OF THE INVENTION

The present invention relates to a water transporting device which can transport water to a water tower. More particularly, the present invention relates to a water transporting device which can save energy while a water tower is located very high.

A conventional water transporting device has a water pipe connected to a water tank and a water tower. However, the conventional water transporting device needs three motors when the water tower is located very high.

SUMMARY OF THE INVENTION

A main object of the present invention is to provide a water transporting device which can save energy efficiently while a water tower is located very high.

Another object of the present invention is to provide a water transporting device which can transport water to a water tower easily.

Accordingly, a water transporting device comprises a sealed water tank, a water channel device, and a pressure reduction tank. The water channel device has a lowest sealed water box, a plurality of sealed water boxes, a highest sealed water box, a plurality of chambers between two of the sealed water boxes, and a plurality of connection pipes. Each of the connection pipes is connected to two of the sealed water boxes. Each of the connection pipes has a water outlet hole in one of the sealed water boxes. An upper end of each connection pipe receives a threaded plug. A washer is disposed between the connection pipe and the threaded plug. A first air exhaust tube is disposed on a top portion of the sealed water tank. An upper end of the first air exhaust tube receives a first cotter bolt. A water inlet tube is connected to the sealed water tank. A first solenoid valve is disposed on the water inlet tube. A water outlet tube is connected to the sealed water tank and the lowest sealed water box. A second solenoid valve is disposed on the water outlet tube. The water outlet tube has a water outlet aperture in the lowest sealed water box. An upper end of the water outlet tube receives a second cotter bolt. A connection tube is connected to the pressure reduction tank and the highest sealed water box. A water outlet pipe is connected to the pressure reduction tank. A third solenoid valve is disposed on the water outlet pipe. The pressure reduction tank has a main body, a gasket disposed on the main body, and an upper cover covering the main body. The upper cover has a lower collar inserted in the main body. A second air exhaust tube is disposed on a top portion of the highest sealed water box. A third air exhaust tube is disposed on a top portion of the upper cover. An upper end of the third air exhaust tube receives a third cotter bolt.

DETAILED DESCRIPTION OF THE INVENTION

Referring to FIGS. 1 to 10, a water transporting device comprises a sealed water tank 10, a water channel device 20, and a pressure reduction tank 30.

Figures 3, 3A:
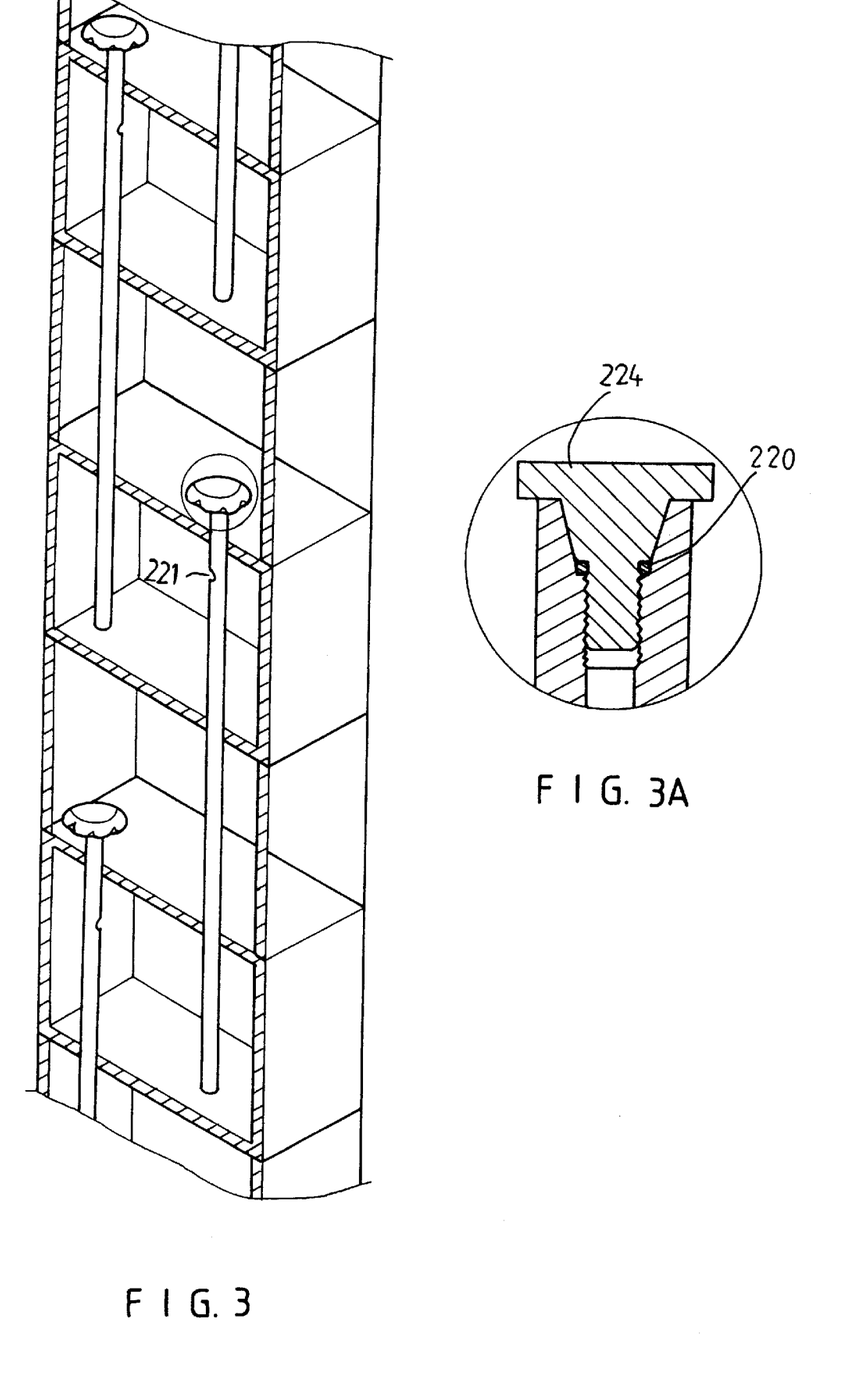
FIG. 3 is a partially perspective view of a water channel device.
FIG. 3A is a sectional assembly view of a connection pipe and a threaded plug.
Figure 4:
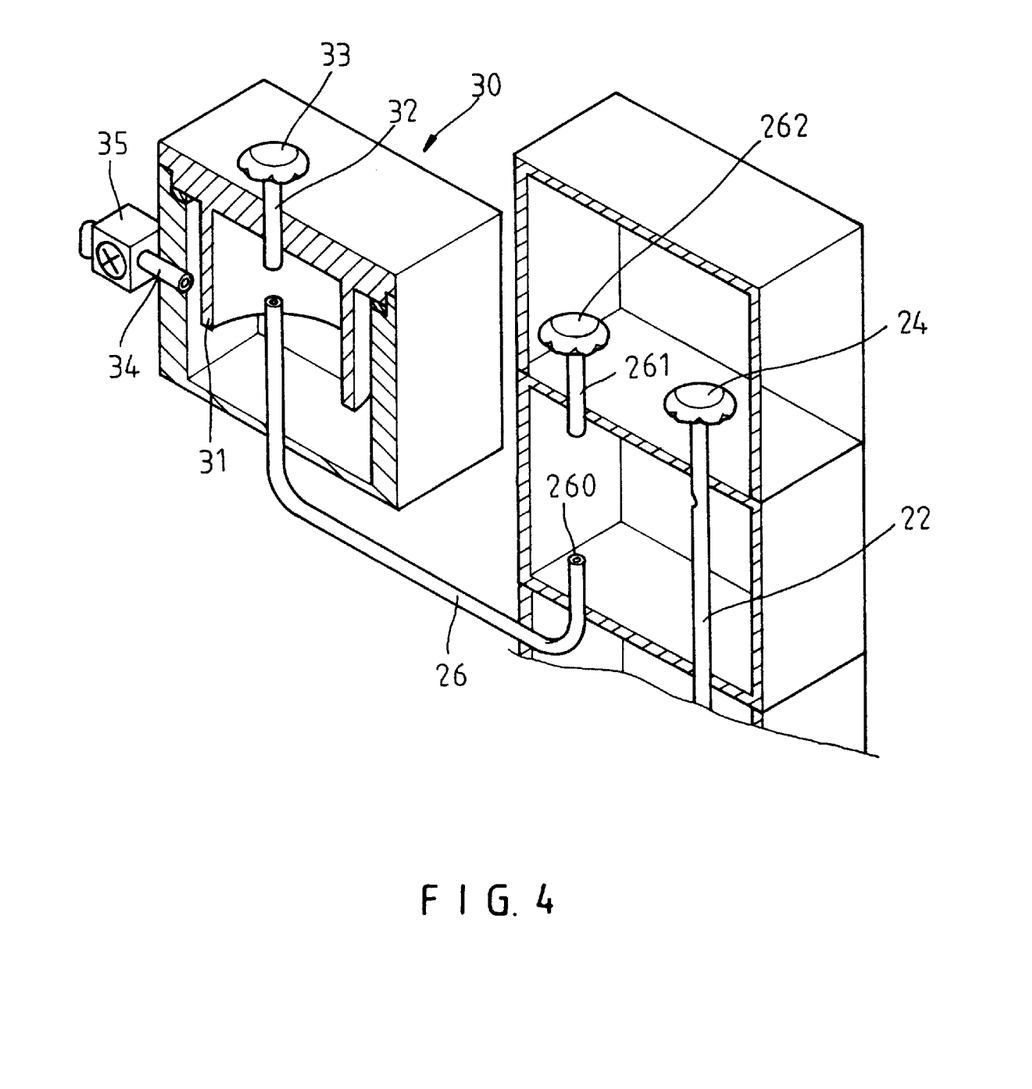
FIG. 4 is a partially perspective view of a water channel device, a connection tube and a pressure reduction tank.

The water channel device 20 has a lowest sealed water box 21, a plurality of sealed water boxes 21, a highest sealed water box 21, a plurality of chambers 23 between two of the sealed water boxes 21, and a plurality of connection pipes 22.

Each of the connection pipes 22 is connected to two of the sealed water boxes 21. Each of the connection pipes 22 has a water outlet hole 221 in one of the sealed water boxes 21. An upper end of each connection pipe 22 receives a threaded plug 24. A washer 220 is disposed between the connection pipe 22 and the threaded plug 24.

Figure 6:
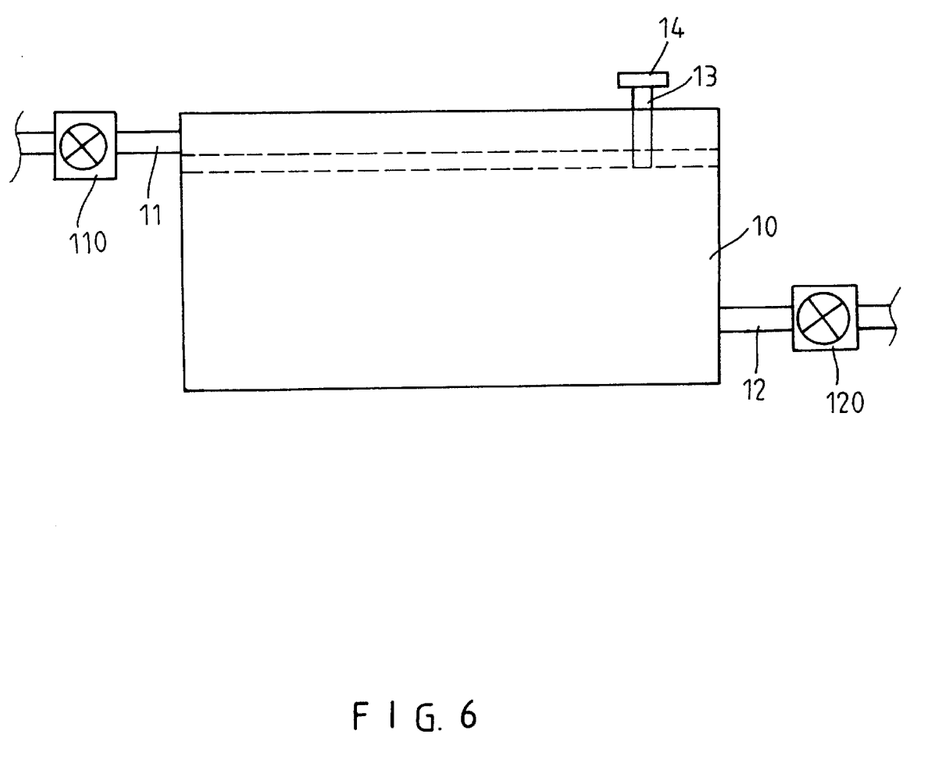
FIG. 6 is a schematic view illustrating a sealed water tank connected to a water inlet tube and a water outlet tube.

A first air exhaust tube 13 is disposed on a top portion of the sealed water tank 10. An upper end of the first air exhaust tube 13 receives a first cotter bolt 14.

A water inlet tube 11 is connected to the sealed water tank 10. A first solenoid valve 110 is disposed on the water inlet tube 11.

A water outlet tube 12 is connected to the sealed water tank 10 and the lowest sealed water box 21. A second solenoid valve 120 is disposed on the water outlet tube 12. The water outlet tube 12 has a water outlet aperture 25 in the lowest sealed water box 21. An upper end of the water outlet tube 12 receives a second cotter bolt 24.

A connection tube 26 is connected to the pressure reduction tank 30 and the highest sealed water box 21.

A water outlet pipe 34 is connected to the pressure reduction tank 30. A third solenoid valve 35 is disposed on the water outlet pipe 34.

Figure 5:
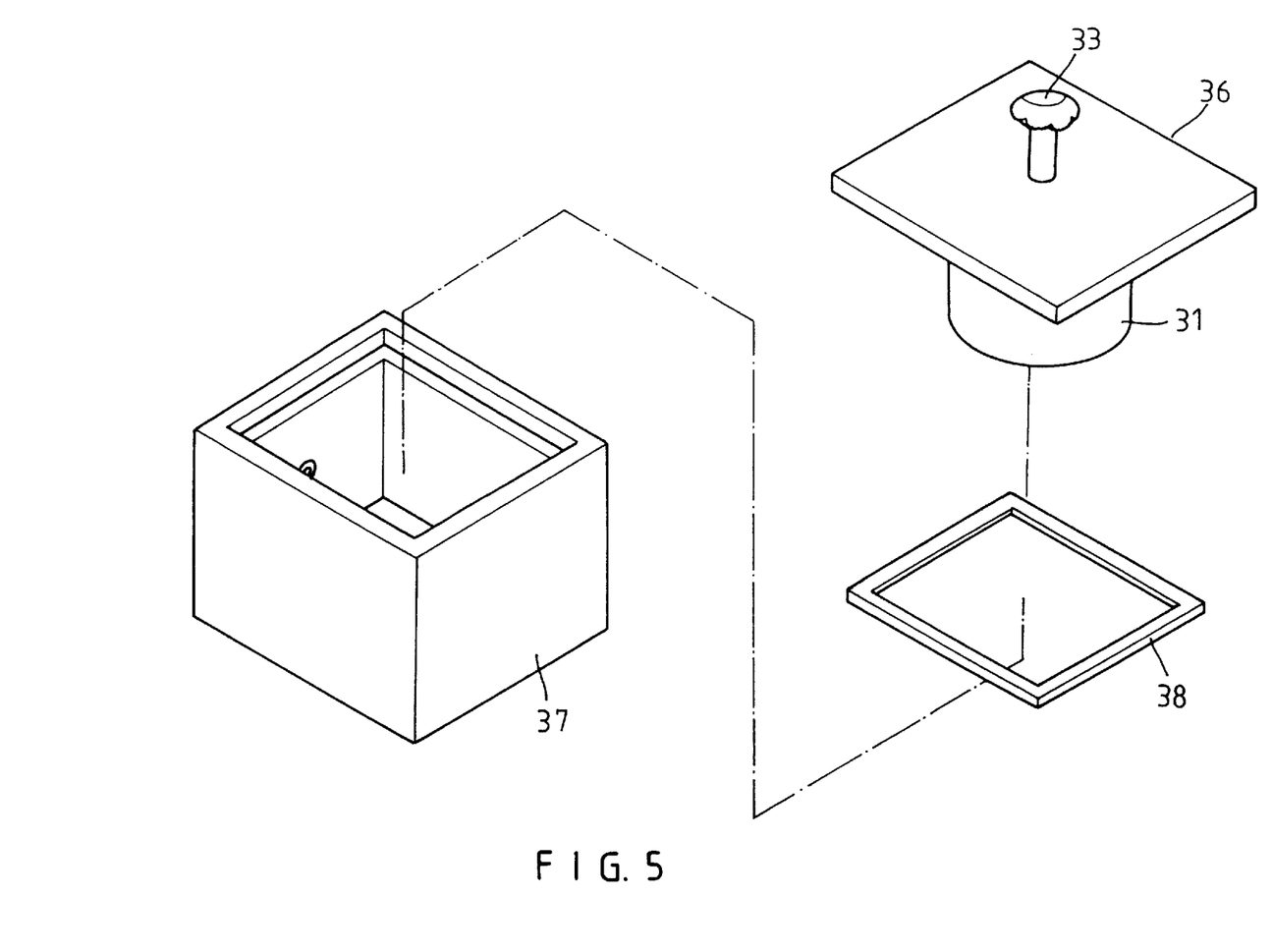
FIG. 5 is a perspective exploded view of a pressure reduction tank.

The pressure reduction tank 30 has a main body 37, a gasket 38 disposed on the main body 37, and an upper cover 36 covering the main body 37. The upper cover 36 has a lower collar 31 inserted in the main body 37.

A second air exhaust tube 261 is disposed on a top portion of the highest sealed water box 21.

A third air exhaust tube 32 is disposed on a top portion of the upper cover 36. An upper end of the third air exhaust tube 32 receives a third cotter bolt 33.

The connection tube 26 has a water inlet end 260 in the highest sealed water box 21.

Figure 1:
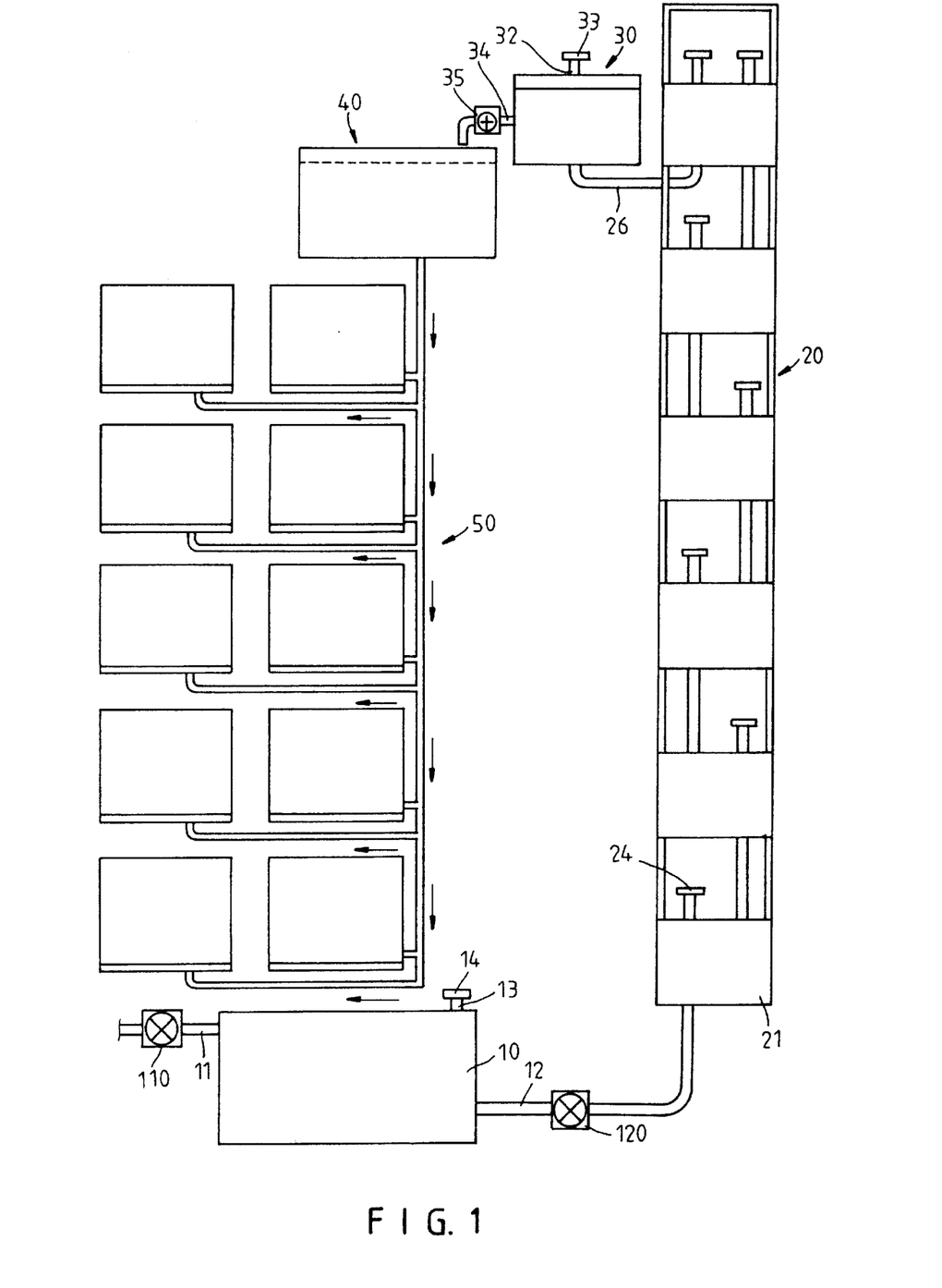
FIG. 1 is a schematic view illustrating an operation of a water transporting device of a preferred embodiment in accordance with the present invention.
Figure 2:
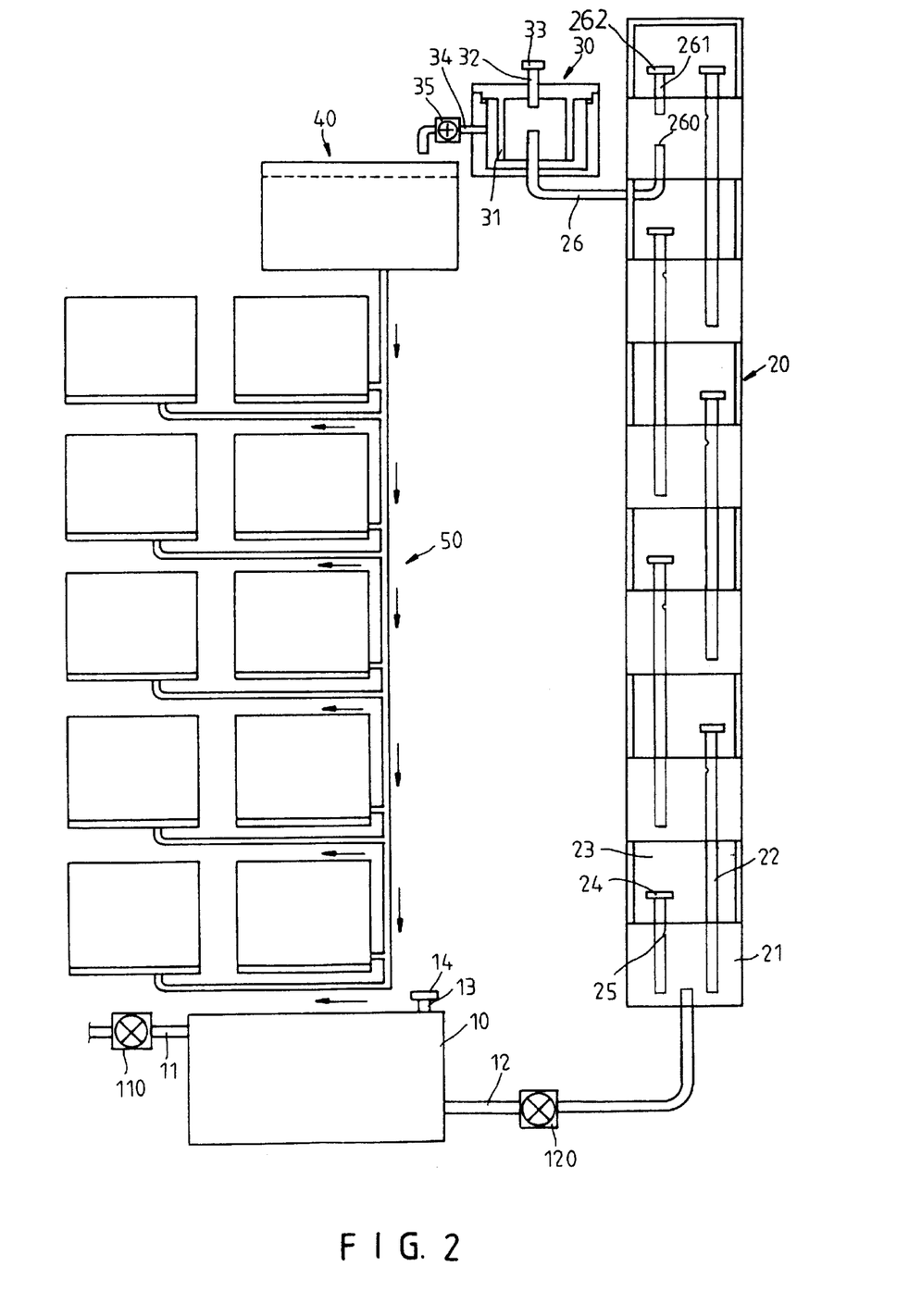
FIG. 2 is a schematic view illustrating a layout of a water transporting device of a preferred embodiment in accordance with the present invention.

A water tower 40 is located beneath the water outlet pipe 34. The water channel device 20 is higher than the water tower 40.

Figure 6A:
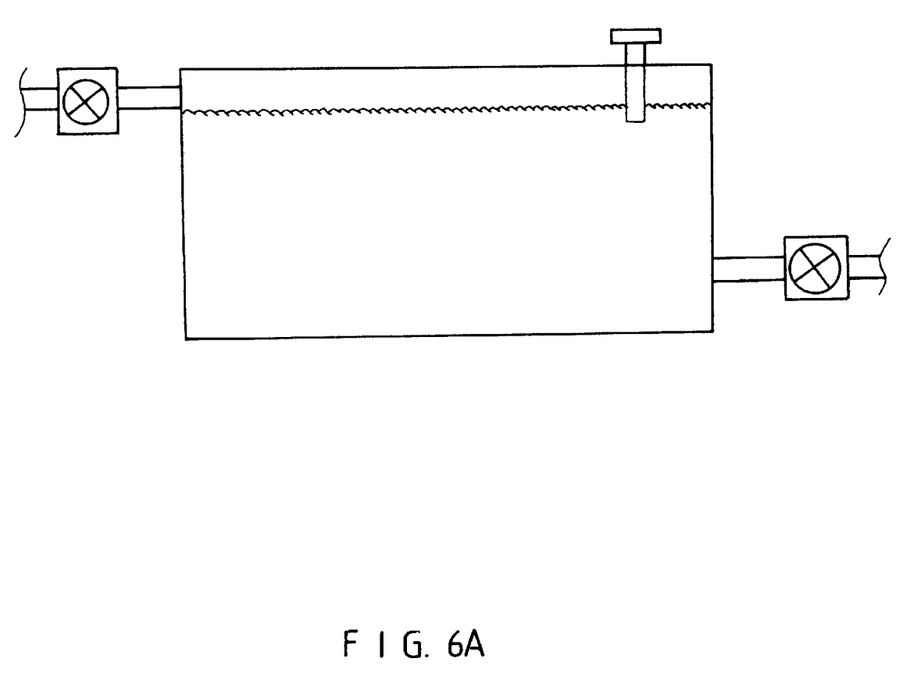
FIG. 6A is a schematic view illustrating a process of transporting water into a sealed water tank.

Referring to FIGS. 6 and 6A, a lower end of the first air exhaust tube 13 is lower than the water inlet tube 11.

Figure 7:
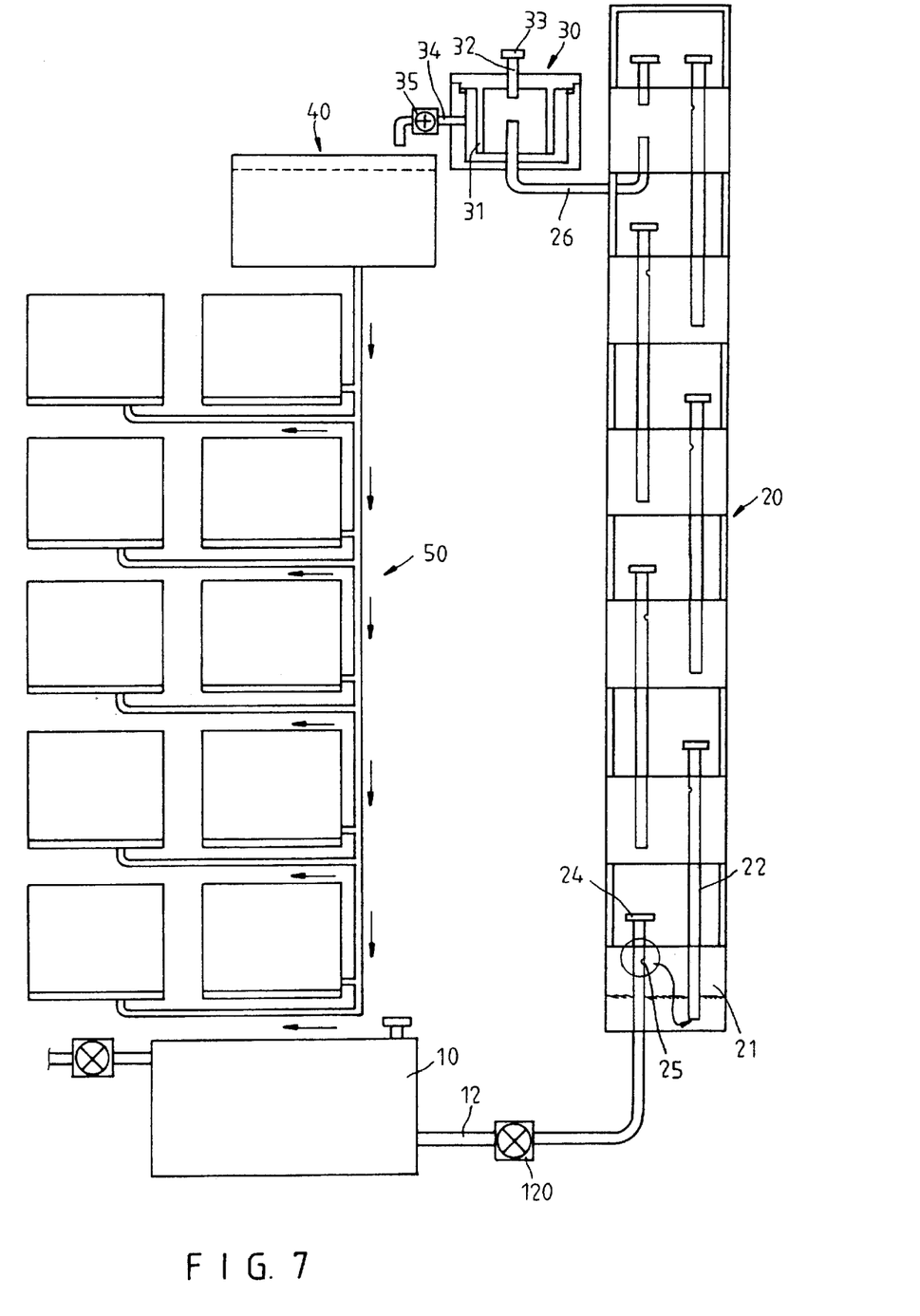
FIG. 7 is a schematic view illustrating a process of transporting water from a water tower.
Figure 7A:
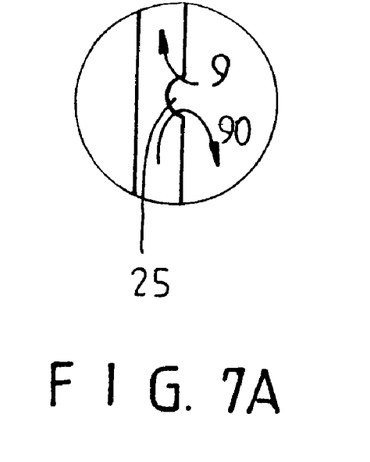
FIG. 7A is a partially enlarged view of a connection pipe in FIG. 7.
Figure 8:
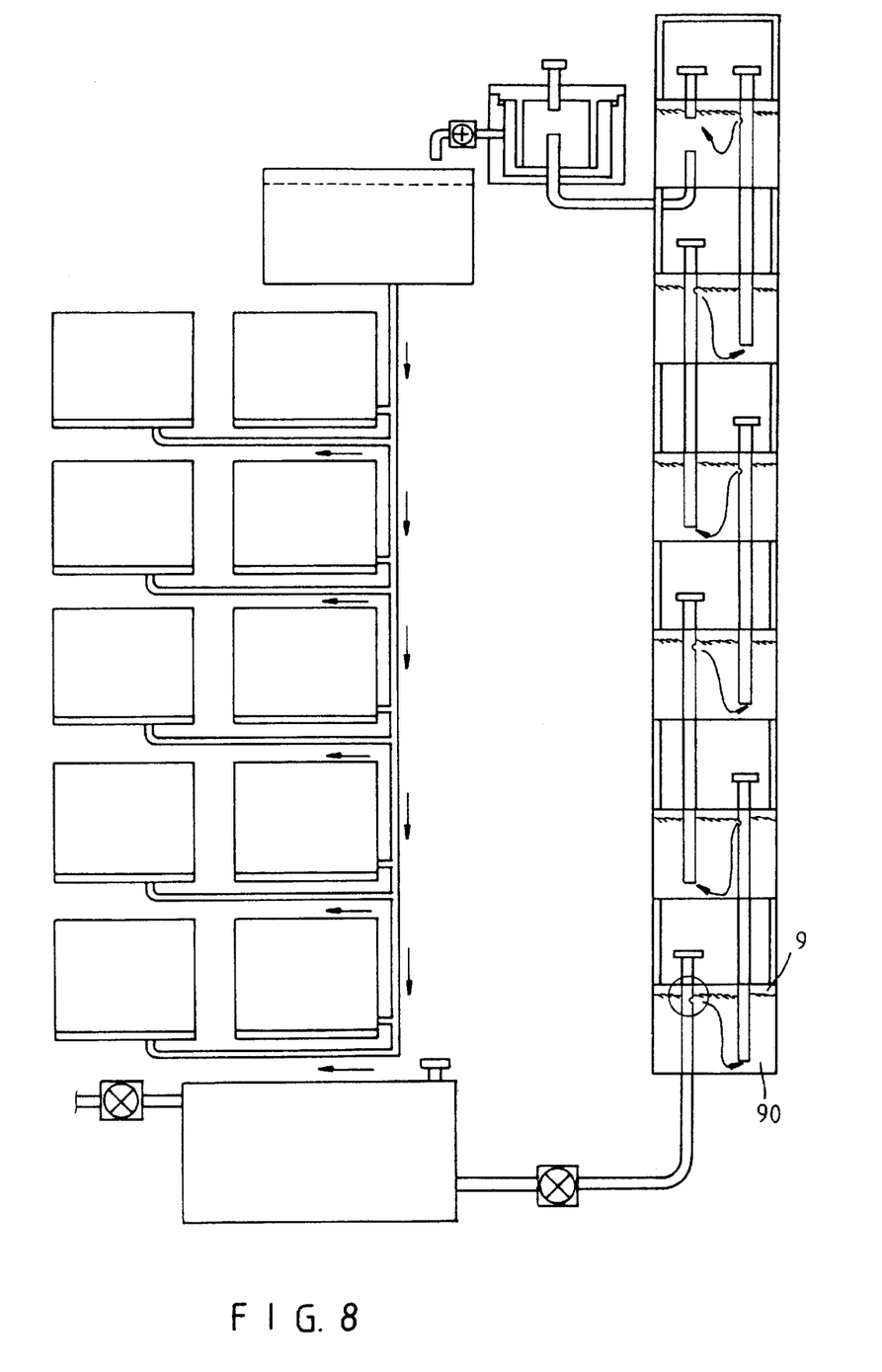
FIG. 8 is a schematic view illustrating a process of transporting water from a water channel device into a water tower.
Figure 8A:
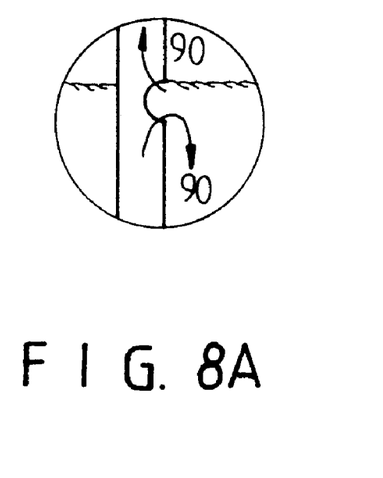
FIG. 8A is a partially enlarged view of a connection pipe in FIG. 8.
Figure 9:
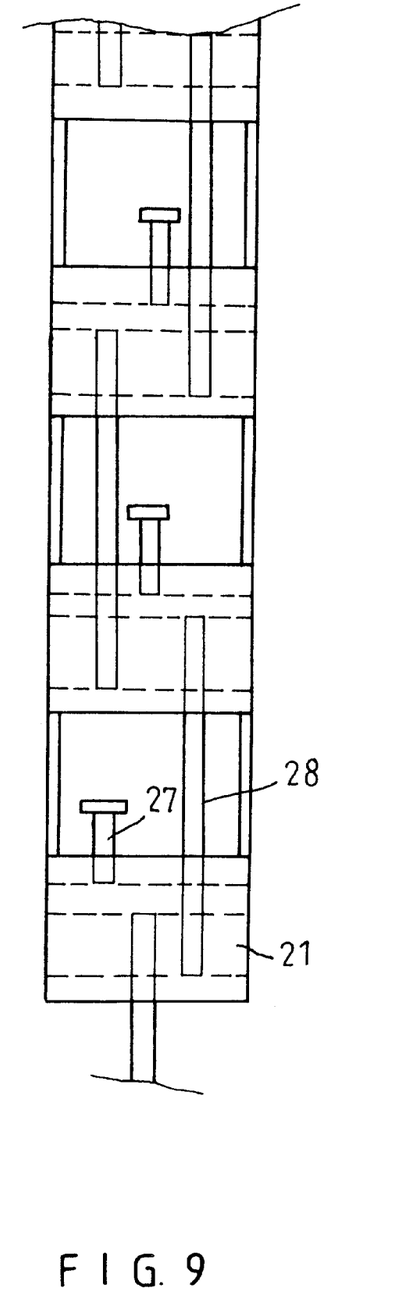
FIG. 9 is a partially enlarged view of a water channel device.
Figure 10:
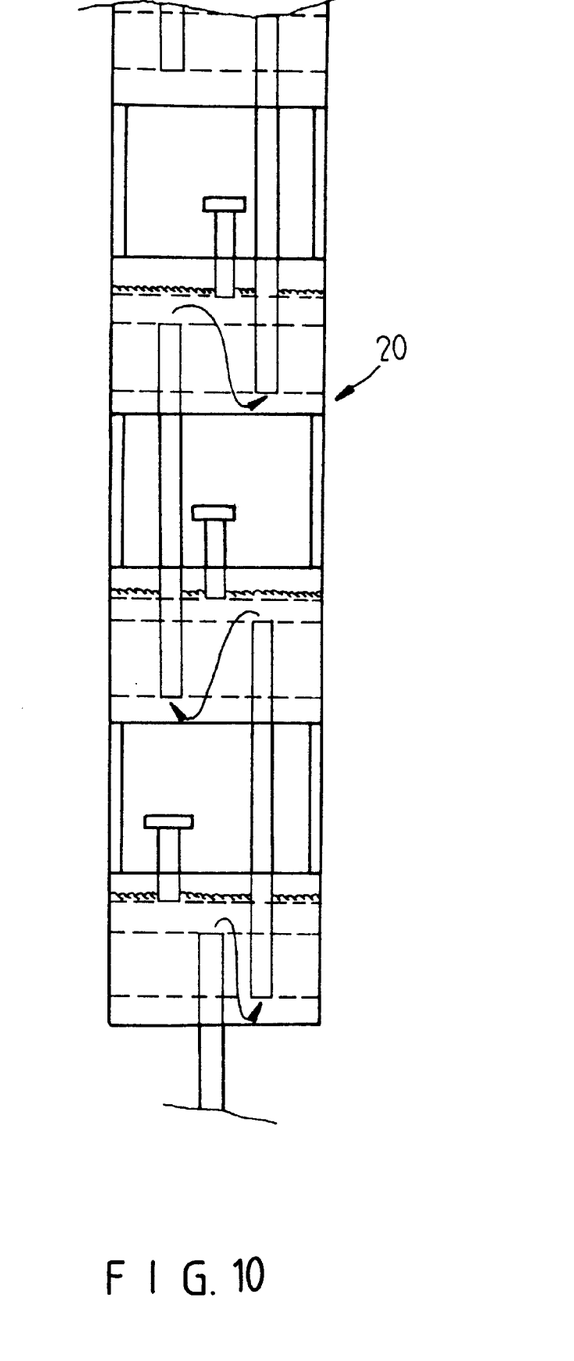
FIG. 10 is a schematic view illustrating a process of transporting water into a water channel device.

Referring to FIGS. 7 to 8A, water 90 and air 9 flow out of the water outlet aperture 25.

Referring to FIGS. 1 to 10 again, the air pressure in the lower collar 31 is larger than the air pressure outside the lower collar 31 in the pressure reduction tank 30.

When the second solenoid valve 120 is opened, water flows into the water channel device 20.

When the pressure reduction tank 30 is full of water, the third solenoid valve 35 is opened.

When the water tower 40 is full of water, the second solenoid valve 120 and the third solenoid valve 35 are closed.

The present invention is not limited to the above embodiment but various modification thereof may be made. Furthermore, various changes in form and detail may be made without departing from the scope of the present invention.

I claim:

1. A water transporting device comprising:

a sealed water tank, a water channel device, and a pressure reduction tank, the water channel device having a lowest sealed water box, a plurality of sealed water boxes, a highest sealed water box, a plurality of chambers between two of the sealed water boxes, and a plurality of connection pipes, each said connection pipe connected to two of the sealed water boxes, each said connection pipe having a water outlet hole in one of the sealed water boxes, an upper end of each said connection pipe receiving a threaded plug, a washer disposed between the connection pipe and the threaded plug, a first air exhaust tube disposed on a top portion of the sealed water tank, an upper end of the first air exhaust tube receiving a first cotter bolt, a water inlet tube connected to the sealed water tank, a first solenoid valve disposed on the water inlet tube, a water outlet tube connected to the sealed water tank and the lowest sealed water box, a second solenoid valve disposed on the water outlet tube, the water outlet tube having a water outlet aperture in the lowest sealed water box, an upper end of the water outlet tube receiving a second cotter bolt, a connection tube connected to the pressure reduction tank and the highest sealed water box, a water outlet pipe connected to the pressure reduction tank, a third solenoid valve disposed on the water outlet pipe, the pressure reduction tank having a main body, a gasket disposed on the main body, and an upper cover covering the main body, the upper cover having a lower collar inserted in the main body, a second air exhaust tube disposed on a top portion of the highest sealed water box, a third air exhaust tube disposed on a top portion of the upper cover, and an upper end of the third air exhaust tube receiving a third cotter bolt.

\* \* \* \* \*